United States Patent
Osterwalder et al.

(10) Patent No.: US 8,635,215 B2
(45) Date of Patent: Jan. 21, 2014

(54) METHOD AND WEB PLATFORM FOR BROKERING KNOW-HOW

(75) Inventors: Cyrill Osterwalder, Dachsen (CH); Roger Caspar, Dallikon (CH)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 12/973,396

(22) Filed: Dec. 20, 2010

(65) Prior Publication Data
US 2011/0153600 A1 Jun. 23, 2011

(30) Foreign Application Priority Data
Dec. 21, 2009 (EP) .................................... 09180144

(51) Int. Cl.
*G06F 17/30* (2006.01)
*G06F 17/18* (2006.01)

(52) U.S. Cl.
USPC .......................... 707/732; 707/733; 707/734

(58) Field of Classification Search
USPC ................... 707/723, 732, 733, 734
See application file for complete search history.

(56) References Cited

U.S. PATENT DOCUMENTS

| | | | | |
|---|---|---|---|---|
| 7,401,025 | B1 * | 7/2008 | Lokitz ............................ | 705/346 |
| 7,827,110 | B1 * | 11/2010 | Wieder ............................ | 705/52 |
| 2002/0167539 | A1 * | 11/2002 | Brown et al. .................. | 345/705 |
| 2005/0038688 | A1 * | 2/2005 | Collins et al. ..................... | 705/9 |
| 2006/0224509 | A1 * | 10/2006 | Walker et al. ................... | 705/40 |
| 2006/0282336 | A1 * | 12/2006 | Huang ............................ | 705/26 |
| 2007/0078758 | A1 | 4/2007 | Susskind et al. | |
| 2007/0242626 | A1 * | 10/2007 | Altberg et al. ................. | 370/259 |
| 2008/0255977 | A1 * | 10/2008 | Altberg et al. .................. | 705/35 |
| 2009/0125403 | A1 * | 5/2009 | Li .................................... | 705/14 |
| 2009/0210321 | A1 * | 8/2009 | Rapp ............................... | 705/27 |
| 2010/0042928 | A1 * | 2/2010 | Rinearson ..................... | 715/737 |
| 2010/0287368 | A1 * | 11/2010 | Shuster et al. ................. | 713/150 |

FOREIGN PATENT DOCUMENTS

WO 2006061149 6/2006

OTHER PUBLICATIONS

European Search Report, EP09180144.9, Apr. 9, 2010, 5 pages.

* cited by examiner

*Primary Examiner* — Christyann Pulliam
*Assistant Examiner* — Sheryl Holland
(74) *Attorney, Agent, or Firm* — Patent Law Works LLP

(57) ABSTRACT

A method for brokering of know-how in various formats between users on an electronic Web service platform includes: allowing users access to the electronic Web service platform, requesting registration data from a user on the platform, managing interest area categories, receiving user offers for know-how in at least one interest area category, enabling searches of users for know-how in at least one interest area category, calculating and displaying a rating in respect of offers in at least one interest area category, approving to a selected offer an agreed exchange of know-how and a corresponding transfer of credit points, conveying selected know-how from the provider to the consumer and booking a corresponding transfer of credit points, and accepting and storing a rating given to the provider by the consumer in respect of the transferred know-how, wherein the rating is assigned to the interest area category of the transferred know-how.

20 Claims, 4 Drawing Sheets

METHOD AND WEB PLATFORM FOR BROKERING KNOW-HOW

CROSS REFERENCE TO RELATED APPLICATIONS

This application claims priority under 35 U.S.C. §119 to corresponding co-pending EPO Application No. EP09180144.9 entitled "Method and Web Platform for Brokering Know-how," filed Dec. 21, 2009, which is herein incorporated by reference in its entirety.

TECHNICAL FIELD

The present invention relates to the field of electronic brokering of know-how in various formats between users (persons or companies) on an electronic Web service platform. More particularly, this invention relates to providing know-how in combination with rating.

BACKGROUND ART

Protocols are conventions or standards that control or enable the connection, communication and data transfer between two computer endpoints, wherein the word computer shall include all devices being able to receive and send digital code. These computer endpoints are defined by URL's in the form of a compact strings of characters, which can be used to represent a resource available on the Internet. Web applications are based on connection, communication and data transfer between such computer endpoints. On the server side application servers and other dynamic content servers such as Web content management systems provide content through a large variety of techniques and technologies typified by the scripting approach. Web browsers can operate on different languages, for example on HTML, XHTML, Javascript, Java, XML and XSLT. Widespread are Web applications with at least one computer endpoint in the form of a Web application server and at least one client computer endpoint with a Web browser.

Web applications with interactions of Web browsers and Web servers can use content description languages, for example HTML (Hyper Text Markup Language), to display Web pages and to make requests. On the client side, the Web application access is typically initiated by using a Web browser (e.g. Mozilla, Firefox, Internet Explorer, Safari, Opera, etc). The Web browser sends a HTTP (Hyper Text Transfer Protocol) request to the Web server in order to receive the HTTP response to the request. The response contains the content description language HTML which tells the Web browser what content to display and how to interact with the Web application, for example by displaying Web forms, Web links or other Web application content.

In modern environments, a Web application platform does not just provide static information to one user on the client side but the benefit of the platform is based on multiple users being registered and acting on the platform (not necessarily at the same time). Social network platforms for example make it possible to connect people on such a Web service platform. Another example are online auctions, where users offer goods for auctioning and others are buying them on the platform. Some Web service platforms also offer the exchange of goods (countertrade, barter) instead of selling them for money. On such auctioning or countertrade platforms it is typical that registered users have a rating based on the transactions they have performed on the platform so far (either in the role of a seller or of a buyer). Such a rating gives a potential buyer some information about the credibility, reliability or trustworthyness of the seller (or vice versa).

U.S. Pat. No. 7,401,025 B1 describes an online list that maintains a minimum criteria level for service providers to be listed. The list is easily accessible by the general public on the internet, or by printed text directories sold in bookstores. It can list not only the service providers credentials but may also provide a current up-to-date rating system by the users themselves. The list or service includes the following information of service providers: profile, duration of business, met licensing requirements, insurance coverage and customer experience references. The qualification information may be updated continually through service provider or consumer. Customers can enter on the web-site their individual experience rating for a listed service provider. This will be added to the rating summary in the database for that service provider. The service does only support the selection of a service provider but it does not support the interaction between provider and consumer.

SUMMARY OF THE INVENTION

In an inventive step it was realized that today there is no platform available providing the exchange of know-how in various formats linked to a rating of the know-how and/or the skills of a provider. The new and inventive platform allows to efficiently getting know-how or services from providers with certain skills or specific know-how approved with a credible rating in categorized interest areas. The platform not only allows a consumer to find a provider with rated skills or rated know-how but also controls the exchange of know-how and the corresponding transmittal of credit points (virtual money inside the platform) or money to the provider and/or the platform. The platform controls the rating of know-how or services and provides rating information. The rating is linked to skill categories respectively know-how interest area categories. This is allowing situations where a provider of know-how or skills in different interest areas can have different ratings in different interest areas respectively different ratings for know-how or skills in different interest areas. There is not a general rating for a provider but a rating for skills or know-how in specific interest area categories.

A preferred embodiment of a method based on this inventive step is a method for brokering of at least one of know-how and skills in various formats between users on an electronic Web service platform, wherein the method includes the steps of allowing users to remotely access the electronic Web service platform, requesting registration data from at least a part of the users on the platform, wherein the real identity information of users is stored in a user database and the registered user is kept anonymous to the users of the platform as long as he does not willingly disclose his real identity to another user, managing interest area categories, wherein the managing includes displaying of interest area categories and enabling amendments of interest area categories by an administrator, receiving user offers for at least one of know-how and skills in at least one interest area category, wherein the offering user is a provider and the receiving includes requesting a selection of a interest area category and a definition of the format of the offer, the formats include answering questions, chatting on a topic, providing data, documents, programs or tools and doing work under specified conditions, enabling searches of users for at least one of know-how and skills in at least one interest area category, wherein the searching user is a consumer and the enabling of searches includes selecting offers in at least one interest area category, calculating and displaying a rating in respect of offers in at least one interest area category, wherein the rating is calculated from ratings given in the respective interest area category to the provider and the rating is corresponding to the quality of the provider's know-how or skill in the respective interest area category, approving to a selected offer an agreed exchange of credit points and of at least one of know-how and work to be done, conveying at least one of selected know-how and an approval on work to be done from the provider to the consumer and booking a corresponding transfer of credit points, and accepting and storing a rating given to the provider by the consumer in respect of the transferred at least one of know-how and work, wherein the rating is assigned to the corresponding interest area category of the transferred know-how or the applied skills.

The expression user database includes any technical method of managing user data for the platform. Chatting on a topic can be done by using keyboard, voice or video chat technology.

A preferred embodiment of the method is further comprising the step of transferring information between the consumer and the provider in order to define the conditions for an exchange of know-how according to a selected offer, wherein the step of transferring information occurs before the step of approving.

Rating is collected for categorized interest areas from consumers after their consumption of know-how or services in the specific interest area. For the consumption of know-how a consumer has to be registered at the platform. Therefore consumers approved for rating a provider are registered on the platform and all rating information can be stored along with the information about the rating consumer. In a preferred embodiment of the platform this allows for registered users to get weighted rating information that depends on the user and his/her connection to the sources of the given rating. High weight can be given to ratings from consumers who were rating skills or know-how in interest areas of other providers in the same way as the actual user. The weighting process can also include informing a user about consumers along with their given ratings and with connections of the rating consumers to the user and requesting weightings from the user for the consumers, wherein the consumers are named with an alias or the real name depending on the relation between user and consumer. The relevance of weighted rating information can be much higher for a user then an average of all existing rating.

In order to allow a weighting process, the rating information of a consumer approved for rating a provider is stored together with the information about the rating consumer. With this information the weight of a specific rating can be chosen depending on the searching user and his/her connection to the sources of a rating. In a preferred embodiment higher weight is given to ratings from consumers who were rating know-how in interest areas of other providers similar to the actual searching user. In another preferred embodiment the searching user is informed about rating consumers with their given ratings and with their connections to the searching user, the rating consumers are named with an alias or the real identity if the real identity is disclosed to the searching user. It is possible to give higher weight to ratings from consumers who gave a good rating to formerly offered know-how of the searching user, preferably in the same interest areas. Still another weighting is giving higher weight to ratings from consumers who got a good rating to their offered know-how from the searching user, preferably to know-how in the same interest areas.

A Web application service platform is providing the functionality to exchange know-how in various electronic formats inside and in brokered services outside the platform and combines it with weighted rating information. The platform can calculate the weighted rating of the provider's skill based on the given rating of consumers for the provider as well as for the consumed know-how. It is also possible that the platform calculates rating for the consumer based on the rating by the provider for the consumer in specified transfer conditions. The platform is running as a Web application service and may be operated internally for an organization or publicly over the Internet or any other publicly available network technology. A person or alias who offers know-how in the platform is called "provider" and a person or alias who searches for know-how and skills is called "consumer". Providers and consumers are users of the platform, where a user can be a person or company. The word user includes male and female persons although the rest of this description uses the male form for simplicity.

A user registers on the platform under a free to choose anonymous alias. For the registration on the platform, the user has to provide his real identity information (e.g. name, postal address, email address). To the platform the user is not anonymous but to all other users of the platform he is anonymous as long as he does not willingly disclose his real identity to another user based on a clearly defined transaction of the platform. The platform supports personal and company accounts. A company account is different from a personal account. Personal users declare their personal skills and know-how which can be in their professional as well as in their private areas. A company account makes the company visible on the platform and the company account is associated with the personal accounts that are related to that company (e.g. the employees of that company).

For an association between a company and a personal account, the company accounts as well as the personal account have to confirm the association and each of them can terminate the association at any point in time. A personal user who confirms an association with a company account can select a subset of his declared skills and offered know-how formats that should be taken into account for the association with the company (e.g. an employee of a company may only want to associate his professional skills with the company account but not his skills in his private hobbies). The company account then reflects the combined skills of all associated personal users in the platform so that a consumer can find a company that comprises certain skills and offers certain know-how exchange.

A providing user offers know-how in defined interest areas, so called skill or interest area categories. For example "Legal→Patents" or "IT→Programming→Java" or "Sports→Fitness" could be such interest areas. The platform defines the structured set of available categories. Based on user feedback and requests the platform administrators may add, change or remove skill or interest area categories to meet the users requirements. The provider can offer various formats of know-how exchange within interest areas (e.g. declaring the will to answer questions interactively, declaring the will to chat on the topic, providing data, documents or tools, or others). The platform offers a structured multi-level catalogue of pre-defined skills. Each user can register on the platform and determine if he wants to act as a consumer, as a provider or both. In the role of a providing user he declares under which skills he wants to be found and provide his know-how. The user can declare his skills for the first time when he registers with the platform as a provider. If a user only wants to search as a consumer, he does not need to declare skills. A basic search of provided skills can even be performed without any registration. This process is very similar to the one well-known in online auctioning platforms where users can search the offers without registration but need to register for transaction as a consumer or as a provider.

The platform may provide functions for premium users who pay a recurring subscription fee that free users cannot use or only to a limited extent. The providing user can update or change his declared skills or his know-how in interest area categories anytime later. Each user is free to choose under which skills he wants to expose himself on the platform. E.g. a user may declare upon registration that he provides know-how in "IT→Programming→Java", "IT→Database→Oracle" and "Social→Language→Italian". At some point later he recognizes that he is also willing to provide know-how for his hobbies under "Art→Music→Transposition" and "Sports→Fitness→Power Plate" and he also declares these skills. Declaring skills means that the user is able to offer his know-how in various formats (e.g. answering questions, chat, tools, data, code, etc) under the declared skill and that he and his offered know-how can be found by searching users under the declared skill. Preferably, all declared skills of a user are associated with a weighted rating which is dynamically calculated by the platform based on the qualitative feedback by consuming users of the exchanged know-how (see more about the rating aspect further below).

A consuming user is searching for providers with certain skills or for know-how in certain interest areas. When newly registered, the provider's skills do not have rating information because no other user has rated any know-how deliveries from that provider yet. When the consumer finds the desired provider with the needed skills or know-how he can consume the offered know-how in different formats electronically inside the platform (e.g. question answering, chat, voice, video-conferencing, documents, tools, etc) or outside the platform (e.g. brokering a service that is delivered outside) against credit points (virtual money inside the platform) or money (brokering fee). Consuming know-how in any kind of electronic format inside the platform is done against credit points in the first place. The providing user defines how many credit points he wants to get from a consumer for a certain know-how exchange. A searching consumer can decide if he wants to accept the offer, consume the know-how and exchange the defined amount of credit points. If the deal is accepted by both parties, the defined amount of credit points is transferred from the consumer to the provider. The platform supports providers with recommendations of suitable credit point amounts to be asked for certain know-how formats. However, since the value of know-how cannot be measured automatically, the definition of the requested credit points can always be set by the provider.

The platform provides electronic negotiation possibilities so that a consumer can send a provider a message and ask him for example to lower the requested amount of credit points or talk to him about other topics of negotiation. In order for a transaction to be settled on the platform, it has to be accepted by both parties. A provider can also set implicit acceptance for proactively provided know-how formats in the platform (e.g. a provider offers an article on a certain topic for download and requests <n> credit points from each user who downloads it so he does not have to manually accept each transaction). For interactive know-how exchange such as question answering or chat, the platform also provides a more flexible credit point definition where the provider can set a range of requested credit points for his provided know-how and the consumer approves to transfer <n> credit points within that range based on his personal approval of the consumed know-how (e.g. if an answer solves a tricky problem immediately and the consumer approves that fact he transfers all of the requested credit points but if the answer does not solve the problem he only transfers a smaller amount). As a fallback option for consumers with no or only few credit points the platform does also provide the possibility to buy know-how against money. Users can also buy credit points against money.

When the consumer searches for suitable providers he will see the weighted rating of the provider's skills respectively the weighted rating of know-how in an interest area category. The displayed rating is based on the ratings he got from other consumers for consumed services or know-how in any format inside or outside the platform. The invention defines the application of an algorithm to aggregate the ratings of the different consumers to attribute the skill of the provider with a weighted rating. That weighted rating is accessible for consumers searching the platform for providers with certain skills. Furthermore, the invention defines the application of an algorithm to give a consumer additional information about the quality of the weighted rating in his specific context, taking into account the connections and dependencies of himself to the sources of the original ratings (to the other consumers that already rated the skill of the looked-at provider).

When a consumer searches for know-how or skills and consumes such, he will rate the quality of the know-how in the consumed format (absolute rating of the consumed know-how and also the quality of the providing user). The platform applies a weighting algorithm to the given rating to attribute a weighted and aggregated rating to the skill of the offering user. For example a provider may offer professional articles in the interest area (skill category) "Legal→Patents". Consumers may search for know-how in the interest area (skill) "Legal-Patents" and will consume the professional articles against credit points (virtual money inside the platform). The consumers rate the offered professional articles regarding the quality and usefulness. The platform applies the weighting algorithm to calculate a credible weighted rating attributed to the skill "Legal→Patents" for the provider. Therefore, exchanged know-how in various formats within one interest area (skill category) will lead to a weighted rating of the skill (not just the specific know-how format) by several consumers over time. Consumers can distinguish providers with different skills and with different ratings on certain skills. For example a cook may have a very positive weighted rating for his skill regarding Indian recipes (e.g. skill "Cooking→Indian") that he offers on the platform but at the same time he may have a poor weighted rating for his skill regarding Italian cuisine (e.g. skill "Cooking→Italian"). This weighted rating of skills creates an immense benefit for consumers searching for know-how in an interest area (skill category) because they get credible information about how good a provider really is at something.

Furthermore, the invention provides weighted rating information for searching consumers depending on the connection of the searching consumer to the sources of ratings (to the other consumers that already rated delivered know-how). Such connections or dependencies may be inside or outside the platform. The invention defines the application of an algorithm to take these connections and dependencies into account to give the searching user more credible rating information about the skills or the know-how of a provider. For example, a consumer may search for an expert in the interest area (skill category) "IT→Database→Oracle". Based on the search he will find providers offering know-how in this area and their skill is already rated as by the first step of the invention. For the searching consumer, the platform will now show additional information about different qualities of the rating depending on connections or dependencies of the searching user to the sources of the rating. If the searching user for example rated somebody else positive and there is a rating available coming from that person it is a more significant rating to the searching user. The platform will dynamically apply an algorithm to weight the available rating of a user's skill in the context of the searching user with additional information from inside or outside the platform. The algorithm could for example check if one of the rating sources is connected to the searching user in one of the (outside the platform available) social networking platforms. If that is the case the searching user will get this information in form of a weighted rating. The weighted rating information will also give the searching user the possibility to see the details where a rating is coming from and why it is weighted in a certain way. That kind of weighted rating uniquely increases the significance of the available ratings to the searching user and will help him to make the right choice where he wants to consume know-how from.

The platform provides the possibility to exchange know-how in various formats online within the platform (e.g. question&answers, chat, voice, video-conferencing, documents, data, etc). As an additional benefit, the platform also makes it possible to broker know-how and services that will be delivered outside the platform. In that case, the online know-how exchange typically is a prequel to validate the selection of a know-how provider. For example a searching user may search for a IT freelancer with Java programming skills. He will find people who offer that kind of skills with the weighted rating information. Based on that he will use simple know-how exchange such as question&answer or chat to check the providing user out before eventually initiating the brokering process that will reveal the real identities to each of the users (provider and consumer). The benefit of the platform is to protect the privacy as long as possible, reduce any overhead for the involved users and cover the rating of the brokered service even if the service is delivered outside of the platform. For such brokered services the platform provides pre-defined contract schemes under which a consumer can negotiate and enter into a cooperation with the provider.

Exchanging know-how in various formats within categorized interest areas (skills) and for rating the quality of a declared skill in a Web service platform is applied whenever a user consumes know-how of another user inside or outside the platform.

In a preferred embodiment, at least one registered user offers his know-how in different interest areas (skills) and another user searches for know-how in this area, leading to a match where the searching user will consume know-how of the providing user and rate the consumed know-how.

Weighted rating information about skills of users offering know-how in various formats in the platform in the context of the searching user's connection and dependencies to the sources of the rating is applied whenever a user has connections to sources of the rating.

The method for associating special company accounts with a selected subset of the declared skills of personal accounts in a Web service platform is applied whenever a company registers with the platform to offer its know-how and services to the public and associates with the skills of affiliated persons.

The inventive methods are implemented in a computer program comprising program code means for performing all the method steps. This program is run on a computer, on a server or on a virtualized server ("in the cloud"). Users are allowed to remotely access the program.

The method steps can be performed by an electronic Web service platform for brokering of know-how in various formats between users.

BRIEF DESCRIPTION OF THE FIGURES

FIG. 2 describes dynamic rating applied by the platform when a consumer searches for know-how and/or skills. The diagram shows the main elements and functions for calculating weighted rating, such as:
a) The provider is declaring user offers for know-how or skills in at least one interest area category on the platform. Know-how can be provided to and stored on the platform
b) The consumer in the need of know-how in a certain interest area is searching for suitable know-how or skills. An offer can be selected by the consumer
c) The platform is calculating the dynamic weighted rating for the specific search context of the consumer taking the existing ratings and eventually a trusted network and confidence information into account (e.g. the history and dependencies of the searching consumer to the sources of the existing rating information)
d) The consumer getting displayed a dynamic view of the search result including the dynamic rating information regarding available provider skills FIG. 3 describes the weighted rating applied by the platform after a know-how exchange has been settled over the platform including the attribution of an aggregated weighted rating to the declared skill based on the rated know-how. The diagram shows the main elements and functions for calculating weighted rating, such as:
a) The consumer is consuming exchanged know-how delivered by the provider over one of the possible transaction formats on the platform until the consumption is finished
b) The platform is calculating weighted rating information of the providers skills in specific interest area categories and his skills based on the rating given by the consumer for the provider and the consumed know-how
c) The platform calculating weighted rating information for the consumer based on the rating given by the provider
d) The platform making the weighted rating information visible for the users in their account as well as for other users of the platform FIG. 4 describes how the company accounts are associated with personal user accounts and a selectable subset of their declared skills. The diagram shows the main elements and functions for the use of company accounts, such as:

Figure 1:
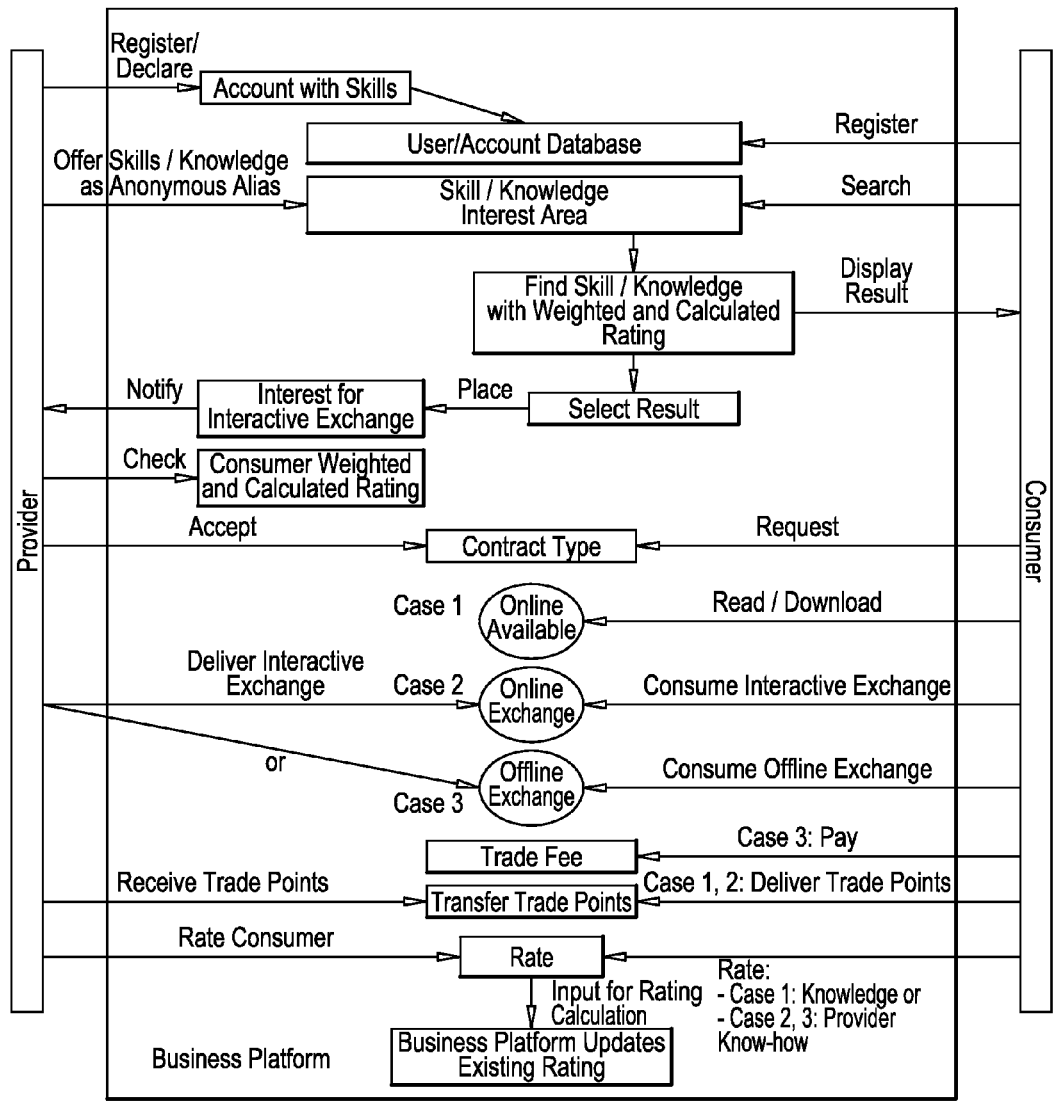
FIG. 1 is a schematic block-diagram showing the main elements and functions of the electronic Web service platform.
Figure 2:
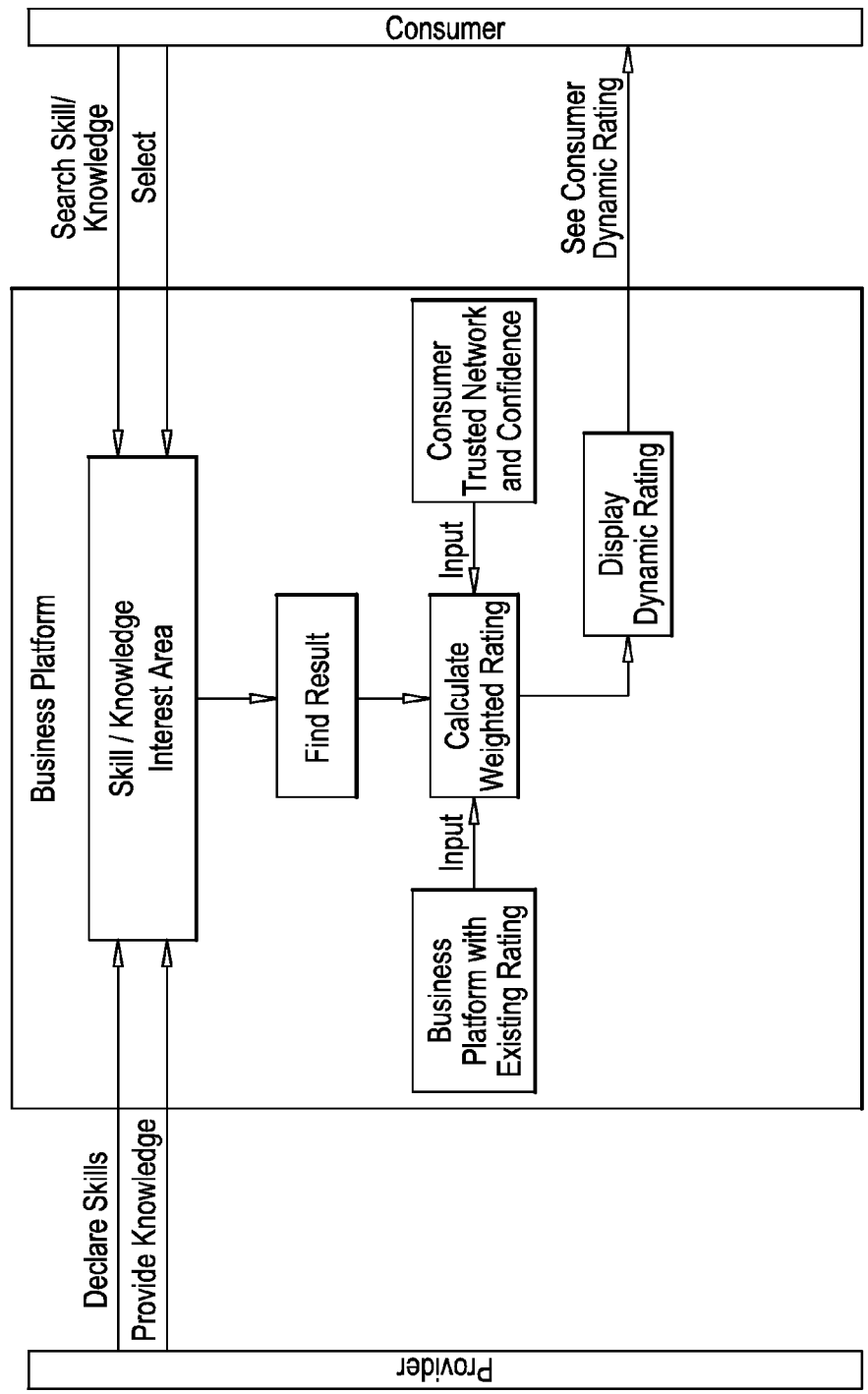
FIG. 2 is a schematic block-diagram showing dynamic rating.
Figure 3:
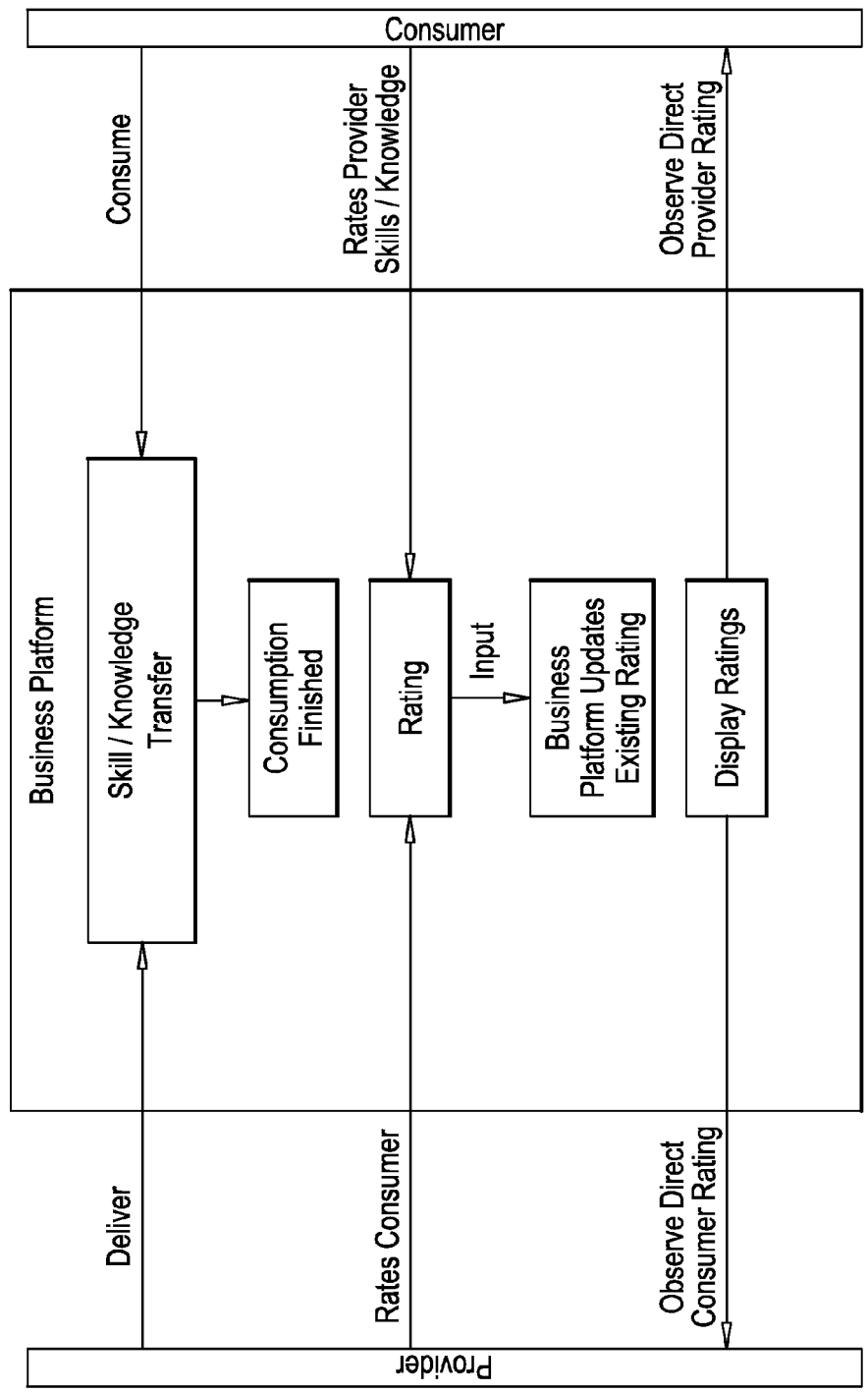
FIG. 3 is a schematic block-diagram showing weighted rating.
Figure 4:
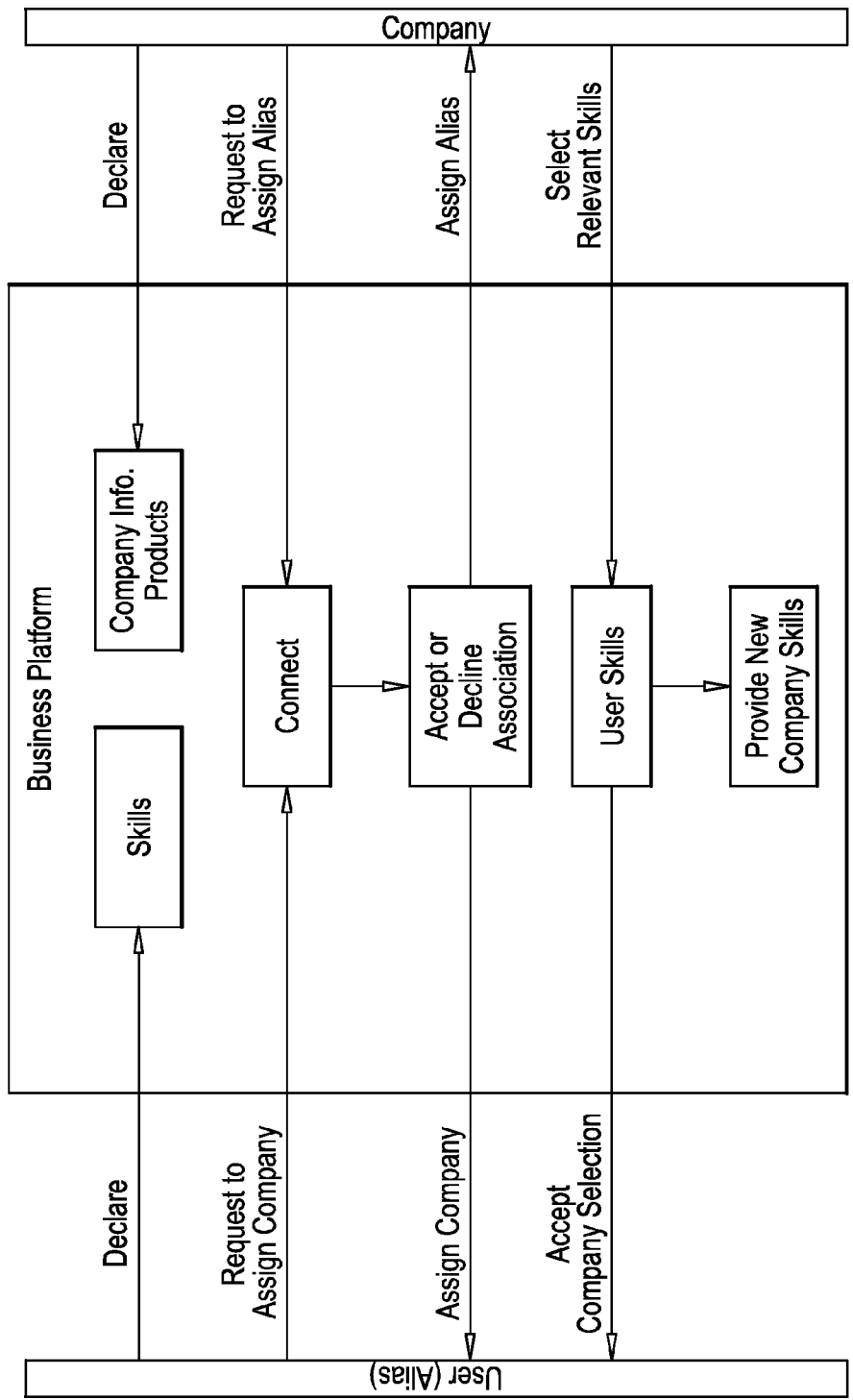
FIG. 4 is a schematic block-diagram showing how the company accounts are associated with personal user accounts FIG. 1 describes the main elements and functions of the electronic Web service platform for brokering of know-how in various formats. On the left side there is a user illustrated in the role of a provider and on the right side one as a consumer. The workflow of the diagram or the inventive method starts at the top and goes to the bottom including the interactive steps between the consumer, the provider and the platform. The diagram shows the main elements and functions of the platform such as:
  a) A provider is registering, declaring his skills and/or offering know-how in specific interest areas categories, wherein the registered information is stored in a user or an account database.
  b) A registered provider can offer know-how and/or skills. Offers for skills and know-how are stored in a skill and know-how database along with categories of the corresponding interest areas.
  c) The consumer in the need of know-how in a certain interest area category is searching for suitable offers with respective know-how or skills. It is possible to allow searching without registering. If a searching user finds know-how to be transferred to him, then he has to register.
  d) The searching user is getting displayed a view of the search result including rating information regarding available provider skills in the respective interest area category.
  e) By selecting one of the offers and by initiating a know-how exchange contact an interest for interactive exchange the searching user is becoming a consumer.
  f) The provider can be notified and then he has to decide if he accepts the know-how exchange with the consumer. The notification of the provider can include a rating of the consumer based on calculated and preferably weighted rating of the consumer by providers who conveyed know-how to the consumer. This step is not necessary in cases where the know-how is already on the platform or where the conditions of a know-how transfer are fixed.
  g) The consumer requesting a know-how exchange being settled on the platform in a defined format where the main different use cases are:
    a. Case 1: The consumer accessing electronically available know-how in the platform that has been uploaded/entered by the provider b. Case 2: The consumer accessing interactive know-how exchange (e.g. through messages, chat, voice or video communication) with the provider
c. Case 3: The consumer settling a pre-defined contract with the provider for know-how exchange or service delivery outside the platform
h) In case 3: The consumer paying a broker fee to the platform for the brokering of the service delivery outside of the platform
i) In case 1 and 2: The platform transferring the agreed amount of credit points from the consumer to the provider.
j) The platform accepting and storing rating by the consumer for the provider and eventually also by the provider for the consumer. The stored ratings allow calculating the weighted rating of the provider's skill or know-how in different interest area categories based on the given ratings for transferred know-how. The platform also supports calculating weighted rating for consumers based on the rating by providers. Rating data of the platform is updated with accepted rating information, wherein filters can prevent storing of unacceptable rating.

a) The personal user is declaring his skills on the platform.
b) The company is declaring company information about products and services on the platform.
c) The platform is connecting personal users and a selectable subset of their declared skills with a company account by assigning an association between the two accounts and the selected skills.
d) The platform is requiring the association being confirmed by the involved personal account as well as the company account.
e) The platform is providing a view of the company including the combined skills of all associated personal accounts to all users of the platform.

The invention claimed is:
1. A method for brokering of at least one of know-how and skills in various formats between users on an electronic web service platform, wherein the method includes the steps of:
remotely accessing the electronic web service platform by a first user and a second user;
requesting registration data from the first user and the second user on the electronic web service platform, wherein real identity information of the first user or the second user is stored in a user database and the first user or the second user is kept anonymous to other users of the electronic web service platform based on user preferences associated with the first user or the second user;
managing interest area categories, wherein the managing includes displaying of the interest area categories and enabling amendments of the interest area categories by an administrator;
receiving an offer from the first user for the at least one of know-how and skills in at least one interest area category, wherein the first user is a provider and receiving the offer includes requesting a selection of the at least one interest area category and a definition of a format of the offer, the format including at least one of answering questions, chatting on a topic, providing data, documents, programs or tools and doing work under specified conditions;
receiving a search from the second user for the at least one of know-how and skills in an interest category included in the at least one interest area category, wherein the second user is a consumer;
determining dependencies between the second user and other consumers based at least in part on determining whether the second user and the other consumers formerly rated each other in interest areas similar to the interest area category;
receiving ratings for the first user in the interest area category from the other consumers;
weighting the ratings for the second user based on the dependencies, the weighting including giving significance to the ratings from the other consumers that formerly received positive ratings from the second user in the interest areas similar to the interest area category;
calculating and providing a first rating associated with the offer and the search in the interest area category based on the weighted ratings and the received ratings for the first user, wherein the first rating corresponds to a quality of the first user's know-how or skills in the interest area category;
selecting the offer from the first user by the second user based on the first rating;
approving the offer of an exchange of credit points and of at least one of know-how and work to be done;

conveying the at least one of know-how and work to be done from the first user to the second user and booking a transfer of the credit points; and accepting and storing a second rating given to the first user by the second user based on the at least one of know-how and work, wherein the second rating is assigned to the interest area category corresponding to the know-how.

2. Method as claimed in claim 1, further comprising the step of transferring information between the first user and the second user in order to define conditions for an exchange of the know-how according to the offer, wherein the step of transferring information occurs before the step of approving.

3. Method as claimed in claim 1, further comprising the step of storing rating information of a third user approved for rating the first user together with information about the second user.

4. Method as claimed in claim 1, further comprising the step of notifying the first user about the second user selecting the offer and comprising the step of requesting an acceptance decision of the first user responsive to the first user accepting a contact with the second user, wherein the acceptance decision of the first user can be based on calculated and preferably weighted rating of the second user.

5. Method as claimed in claim 1, further comprising the step of rating the second user wherein the rating for the second user is calculated from ratings of providers having conveyed their know-how or skills to the second user.

6. Method as claimed in claim 1, wherein conveying the at least one of know-how and work to be done from the first user to the second user comprises delivering the know-how outside the electronic web service platform.

7. Method as claimed in claim 1, wherein the step of weighting the ratings comprises giving high weights to the ratings from the other consumers who were rating the know-how in interest areas of other providers similar to the interest area category searched by the second user.

8. Method as claimed in claim 1, wherein the step of weighting the ratings comprises giving high weights to the ratings from the other consumers who are connected to the second user in at least one further web service platform preferably in a social and business networking platform, wherein such a connection is searched for by a searching algorithm.

9. Method as claimed in claim 1, wherein in the step of receiving the ratings, the second user is informed about the other consumers who approved for rating the first user with their given ratings and with their connections to the second user, each of the other consumers who approved for rating the first user is named with an alias or a real identity if the real identity is disclosed to the second user.

10. Method as claimed in claim 1, wherein the step of weighting the ratings comprises giving high weights to the ratings from the other consumers who gave a good rating to formerly offered know-how of the second user, preferably in same interest areas.

11. Method as claimed in claim 1, further comprising the step of registering the first user with the electronic web service platform.

12. Method as claimed in claim 1, wherein the electronic web service platform supports personal and company accounts and the method further comprising the steps of:

selecting, by a personal user, from a personal account a subset of declared skills and know-how formats to be connected to a company;

connecting the subset from the personal account to a company account;

requesting confirmations to the connection from the personal account and the company account; and responsive to receiving the confirmations, providing combined subsets of declared skills and know-how formats of all connected personal accounts in the company account.

13. A computer program product comprising a non-transitory computer usable medium including computer program code means, wherein the computer program code when run on a computer causes the computer to:

remotely access an electronic web service platform by a first user and a second user;

request registration data from the first user and the second user on the electronic web service platform, wherein real identity information of the first user or the second user is stored in a user database and the first user or the second user is kept anonymous to other users of the electronic web service platform based on user preferences associated with the first user or the second user;

manage interest area categories, wherein the managing includes displaying of the interest area categories and enabling amendments of the interest area categories by an administrator;

receive an offer from the first user for at least one of know-how and skills in at least one interest area category, wherein the first user is a provider and receiving the offer includes requesting a selection of the at least one interest area category and a definition of a format of the offer, the format including at least one of answering questions, chatting on a topic, providing data, documents, programs or tools and doing work under specified conditions;

receive a search from the second user for the at least one of know-how and skills in an interest category included in the at least one interest area category, wherein the second user is a consumer;

determine dependencies between the second user and other consumers based at least in part on determining whether the second user and the other consumers formerly rated each other in interest areas similar to the interest area category;

receive ratings for the first user in the interest area category from the other consumers;

weight the ratings for the second user based on the dependencies, the weighting including giving significance to the ratings from the other consumers that formerly received positive ratings from the second user in the interest areas similar to the interest area category;

calculate and provide a first rating associated with the offer and the search in the interest area category based on the weighted ratings and the received ratings for the first user, wherein the first rating corresponds to a quality of the first user's know-how or skills in the interest area category;

select the offer from the first user by the second user based on the first rating;

approve the offer of an exchange of credit points and of at least one of know-how and work to be done;

convey the at least one of know-how and work to be done from the first user to the second user and book a transfer of the credit points; and accept and store a second rating given to the first user by the second user based on the at least one of know-how and work, wherein the second rating is assigned to the interest area category corresponding to the know-how.

14. A system for brokering of at least one of know-how and skills in various formats between users comprising:

a computer comprising one or more processors that execute instructions to cause the system to:

remotely access an electronic web service platform by a first user and a second user;

request registration data from the first user and the second user on the electronic web service platform, wherein real identity information of the first user or the second user is stored in a user database and the first user or the second user is kept anonymous to other users of the electronic web service platform based on user preferences associated with the first user or the second user;

manage interest area categories, wherein the managing includes displaying of the interest area categories and enabling amendments of the interest area categories by an administrator;

receive an offer from the first user for the at least one of know-how and skills in at least one interest area category, wherein the first user is a provider and receiving the offer includes requesting a selection of the at least one interest area category and a definition of a format of the offer, the format including at least one of answering questions, chatting on a topic, providing data, documents, programs or tools and doing work underspecified conditions;

receive a search from the second user for the at least one of know-how and skills in an interest category included in the at least one interest area category, wherein the second user is a consumer;

determine dependencies between the second user and other consumers based at least in part on determining whether the second user and the other consumers formerly rated each other in interest areas similar to the interest area category;

receive ratings for the first user in the interest area category from the other consumers;

weight the ratings for the second user based on the dependencies, the weighting including giving significance to the ratings from the other consumers that formerly received positive ratings from the second user in the interest areas similar to the interest area category;

calculate and provide a first rating associated with the offer and the search in the interest area category based on the weighted ratings and the received ratings for the first user, wherein the first rating corresponds to a quality of the first user's know-how or skills in the interest area category;

select the offer from the first user by the second user based on the first rating;

approve the offer of an exchange of credit points and of at least one of know-how and work to be done;

convey the at least one of know-how and work to be done from the first user to the second user and booking a transfer of the credit points; and accept and store a second rating given to the first user by the second user based on the at least one of know-how and work, wherein the second rating is assigned to the interest area category corresponding to the know-how.

15. The computer program product of claim 13, wherein the computer program code when run on a computer further causes the computer to transfer information between the first user and the second user in order to define conditions for an exchange of the know-how according to the offer, wherein the step of transferring information occurs before the step of approving.

16. The computer program product of claim 13, wherein the computer program code when run on a computer further causes the computer to:

notify the first user about the second user selecting the offer; and request an acceptance decision of the first user responsive to the first user accepting a contact with the second user, wherein the acceptance decision of the first user is based on calculated and preferably weighted rating of the second user.

17. The computer program product of claim 13, wherein the computer program code when run on a computer further causes the computer to rate the second user, wherein the rating for the second user is calculated from ratings of providers having conveyed their know-how or skills to the second user.

18. The system of claim 14, wherein the electronic web service platform transfers information between the first user and the second user in order to define conditions for an exchange of the know-how according to the offer, wherein the step of transferring information occurs before the step of approving.

19. The system of claim 14, wherein the electronic web service platform:

notifies the first user about the second user selecting the offer; and requests an acceptance decision of the first user responsive to the first user accepting a contact with the second user, wherein the acceptance decision of the first user is based on calculated and preferably weighted rating of the second user.

20. The system of claim 14, wherein the electronic web service platform rates the second user, wherein the rating for the second user is calculated from ratings of providers having conveyed their know-how or skills to the second user.

* * * * *